(12) United States Patent
Hattori et al.

(10) Patent No.: US 7,447,577 B2
(45) Date of Patent: Nov. 4, 2008

(54) CURVE'S RADIUS ESTIMATION DEVICE

(75) Inventors: Akira Hattori, Sunto-gun (JP); Minoru Saeki, Seto (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 225 days.

(21) Appl. No.: 10/733,464

(22) Filed: Dec. 12, 2003

(65) Prior Publication Data

US 2004/0143416 A1 Jul. 22, 2004

(30) Foreign Application Priority Data

Jan. 17, 2003 (JP) .............................. 2003-009987

(51) Int. Cl.
  *G06F 17/00* (2006.01)
(52) U.S. Cl. .......................................... 701/41; 701/72
(58) Field of Classification Search ...................... 701/1, 701/41, 72, 96, 300, 301, 36, 37, 42, 44, 701/45, 48, 49, 70, 93, 97, 200, 205, 207, 701/223; 180/170, 172; 342/70, 71; 340/435, 340/436, 903; 702/157
See application file for complete search history.

(56) References Cited

U.S. PATENT DOCUMENTS

| | | | | |
|---|---|---|---|---|
| 4,700,960 A | * | 10/1987 | Miki et al. ................... | 180/414 |
| 5,233,527 A | * | 8/1993 | Shinnosuke ................... | 701/28 |
| 5,350,912 A | * | 9/1994 | Ishida ......................... | 250/202 |
| 5,446,657 A | * | 8/1995 | Ikeda et al. ................... | 701/41 |
| 5,467,283 A | * | 11/1995 | Butsuen et al. .............. | 701/301 |
| 5,612,699 A | * | 3/1997 | Yamada ........................ | 342/70 |
| 5,742,507 A | * | 4/1998 | Eckert .......................... | 701/70 |
| 5,854,987 A | * | 12/1998 | Sekine et al. ................. | 701/41 |
| 5,878,361 A | * | 3/1999 | Sekine et al. ................. | 701/41 |
| 6,018,308 A | | 1/2000 | Shirai | |
| 6,466,863 B2 | * | 10/2002 | Shirai et al. ................. | 701/200 |
| 6,470,241 B2 | * | 10/2002 | Yoshikawa ..................... | 701/1 |
| 2001/0053955 A1 | | 12/2001 | Shirai et al. | |
| 2002/0016663 A1 | | 2/2002 | Nakamura et al. | |
| 2002/0138192 A1 | | 9/2002 | Lueder et al. | |

FOREIGN PATENT DOCUMENTS

| | | |
|---|---|---|
| EP | 0 657 857 A1 | 6/1995 |
| JP | A-06-131596 | 5/1994 |
| JP | A-08-219799 | 8/1996 |
| JP | A-09-049875 | 2/1997 |
| JP | A-09-091598 | 4/1997 |
| JP | A 09-240314 | 9/1997 |
| JP | A 2001-328451 | 11/2001 |

* cited by examiner

*Primary Examiner*—Jack W Keith
*Assistant Examiner*—Edward Pipala
(74) *Attorney, Agent, or Firm*—Oliff & Berridge, PLC

(57) ABSTRACT

A curve's radius of a road on which a vehicle shall run is estimated based on actual speed, yaw rate, and steering angle of the vehicle. Accordingly, during a transition state of the vehicle, the curve's radius can be estimated with the actual yaw rate taking into account the actual steering angle that can reflect more accurately turning behavior of the vehicle than the actual yaw rate. Therefore, errors in the estimation of the curve's radius due to response delay of the actual yaw rate can be easily reduced even though the yaw rate is used for such estimation.

7 Claims, 10 Drawing Sheets

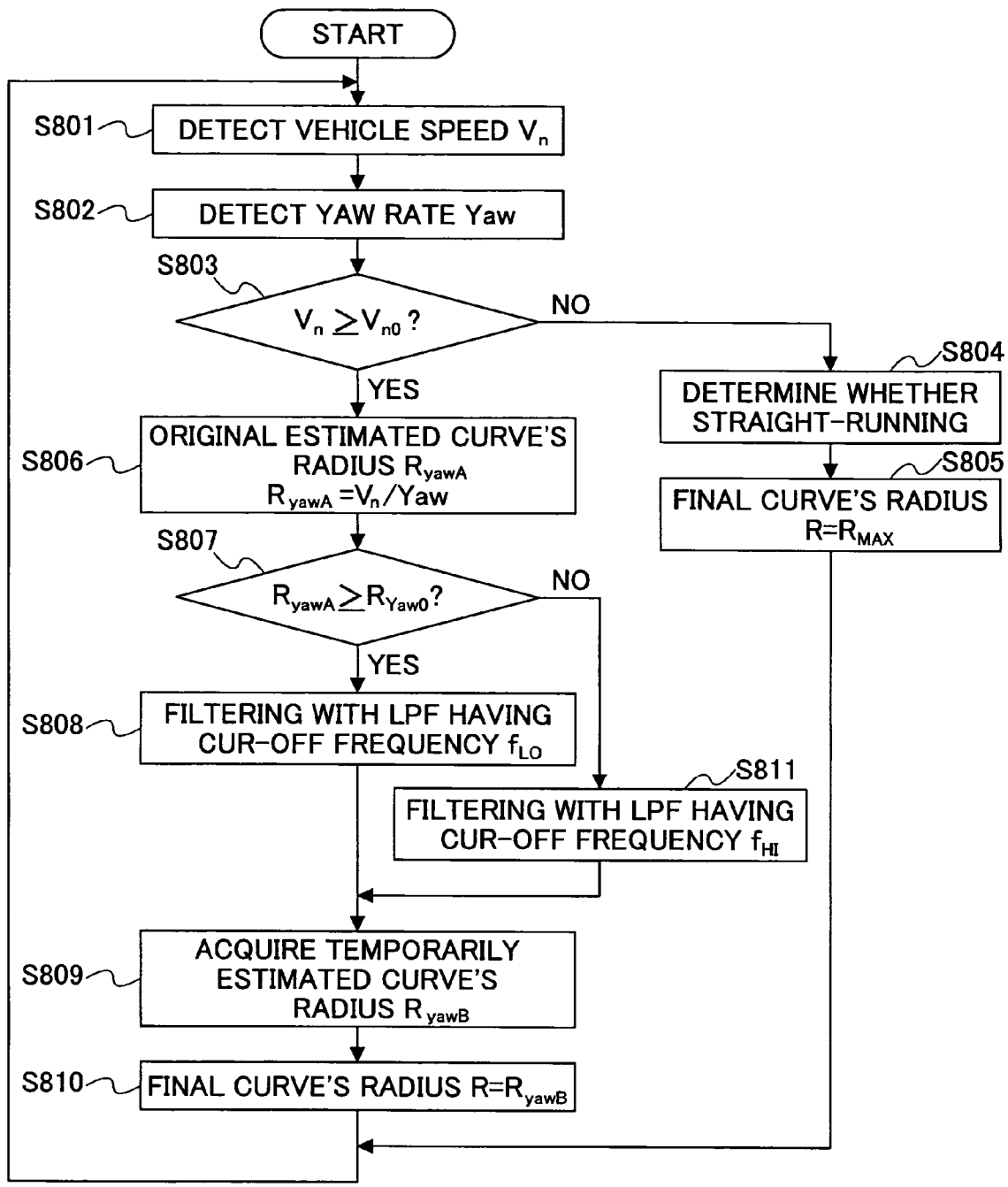

CURVE'S RADIUS ESTIMATION DEVICE

BACKGROUND OF THE INVENTION

1. Field of the Invention

The present invention relates to a technique for estimating a curve's radius of a road on which a vehicle shall run, and more particularly to a technique for improving accuracy of such estimation.

2. Description of the Related Art

There is an example of a conventional technique for estimating the curve's radius (a radius of curvature) of the road to be traveled by the vehicle (see Japanese Laid-Open Patent Application No. 2001-328451).

In this conventional technique, a first curve's radius representing a course of the vehicle is calculated by alternatively using a steering angle of a steering wheel handled by a driver of the vehicle and a yaw rate of it. Also, a second curve's radius representing the course of the vehicle is calculated by using a position of a stationary object (such as a fixedly-installed reflecting mirror) located in the front of the vehicle. Further, a third curve's radius representing the course of the vehicle is calculated by averaging the above two types of calculated curve's radius.

SUMMARY

The inventors of the present invention have studied techniques for estimating the curve's radius on the basis of the actual speed of the vehicle and the actual yaw rate, and acquired the following knowledge.

The actual yaw rate of the vehicle is a physical quantity that is output from that vehicle and inherently represents the actual turning behavior of it. Accordingly, in the case of the estimation of the curve's radius with the actual yaw rate, the curve's radius can be almost accurately estimated because such yaw rate theoretically reflects vehicle characteristics information (stability factors including a factor regarding the cant of the road surface) on the vehicle.

In contrast, the actual steering angle of the vehicle is a physical quantity that is input into that vehicle. Accordingly, to estimate the curve's radius with the actual steering angle, the vehicle characteristics information must be taken into account.

Therefore, the curve's radius can be estimated more easily using the actual yaw rate than using the actual steering angle.

However, when the vehicle is running on a curved road, a true traveling direction of the vehicle and the yaw rate actually taking place on the vehicle at the time develop a strong tendency not to match each other as a turning movement of the vehicle strays from steady state, even though the true traveling direction and the actual yaw rate match each other if the turning movement is completely under the steady state. The reason is that since the actual yaw rate is the physical quantity that is output from the vehicle depending on variation of the actual steering angle input into it, there is a time lag between when the actual steering angle varies and when it appears as variation of the actual yaw rate. Thus, there is a response delay in the actual yaw rate. This means that there may be a phenomenon that the actual yaw rate does not accurately reflect the actual turning behavior of the vehicle.

Consequently, in the case of the estimation of the curve's radius with the actual yaw rate, an estimate of the curve's radius may be shifted from an actual value unless the vehicle is under the steady turning state.

For example, when the vehicle approaches an exit of the curved path and goes into a stage for trying to make the transition from the curved path to a straight path, the driver makes the transition from a keeping handling for keeping the steering wheel at a turning position to a turning back handling for turning the steering wheel back to a neutral position. Under such transition state where the actual steering angle is varying, the actual yaw rate is supposed to vary to follow the variation of the actual steering angle, but with a delay in its response. Consequently, around the exit of the curved path, the curve's radius estimated using the actual yaw rate has a tendency to be shifted from the actual curve's radius.

The inventors of the present invention have acquired knowledge that when the actual yaw rate and the actual steering angle are used for the estimation of the curve's radius, disadvantages, which may occur when only the actual yaw rate is used but the actual steering angle is not used for the estimation, will be eliminated by taking into account the actual steering angle.

The inventors of the present invention have acquired such knowledge by their own study, and it is not disclosed in the above-described Japanese Laid-Open Patent Application No. 2001-328451.

On the basis of the above knowledge, an object of the present invention is to reduce errors in the estimation of the curve's radius due to the response delay of the actual yaw rate when it is used for the estimation of the curve's radius of the road on which the vehicle shall run.

According to the present invention, the following aspects are achieved. Some aspects are described by quoting other aspects. Since these aspects are provided for facilitating the understanding of some or a combination of technical features described in this specification, the technical features or combinations thereof are not construed to be limited to the following aspects.

Aspect 1 of the present invention is a curve's radius estimation device for estimating a curve's radius of a road on which the vehicle shall run, comprising:

a vehicle speed sensor for detecting an actual vehicle speed of the vehicle;

a yaw rate sensor for detecting an actual yaw rate of the vehicle;

a steering angle sensor for detecting an angle of a steering wheel handled by a driver of the vehicle as an actual steering angle; and an estimator for estimating the curve's radius on the basis of the actual vehicle speed detected by the vehicle speed sensor, the actual yaw rate detected by the yaw rate sensor, and the actual steering angle detected by the steering angle sensor.

According to this device of Aspect 1, the curve's radius of the road on which the vehicle shall run is estimated on the basis of the actual vehicle speed, the actual yaw rate, and the actual steering angle of the vehicle. Therefore, according to this device of Aspect 1, during the transition state of the vehicle, the curve's radius can be estimated using the actual yaw rate taking into account the actual steering angle that can reflect more quickly a turning behavior of the vehicle than the actual yaw rate. Accordingly, the errors in the estimation of the curve's radius due to the response delay of the actual yaw rate can be easily reduced even though the yaw rate is used for such estimation.

In this and the following aspects, the terms of the "curve's radius" may mean the curvature radius of the curved path or the curvature radius of the substantially or completely straight path (that is infinite or having a maximum finite value).

Aspect 2 of the present invention is the curve's radius estimation device as described in Aspect 1, the estimator comprising:

a base value estimation part for estimating the curve's radius as a base value on the basis of the actual vehicle speed and the actual yaw rate but not of the steering angle; and an estimation part for determining an amount of correction for the base value on the basis of physical quantity regarding the steering angle, and estimating the curve's radius by correcting the base value with the amount of correction.

According to an example of this device of Aspect 2, the curve's radius can be estimated without taking into account the vehicle characteristic information even though the actual steering angle is used for such estimation. Therefore, according to this example, it can be facilitated to make it easy to calculate the estimate of the curve's radius even though the actual steering angle is used.

Aspect 3 of the present invention is the curve's radius estimation device as described in Aspect 2, the estimator further comprising an enabling part for enabling the estimation of the curve's radius when an expected value of the curve's radius is equal to or below a predetermined value and a state of temporal variation of the curve's radius does not exceed a predetermined state for a predetermined time period or longer.

It can be determined that the road on which the vehicle is running is the kind of road in which the response delay of the actual yaw rate is negligible when the expected value of the curve's radius exceeds the predetermined value. Meanwhile, it can be determined that the road on which the vehicle is running is the kind of road having the curvature radius (that is equal to a turning radius) in which the response delay of the actual yaw rate is significant when the expected value of the curve's radius is equal to or below the predetermined value.

Also, it is appropriate to determine that the running state of the vehicle is steady state when a state of temporal variation of the base value of the curve's radius does not exceed the predetermined state for the predetermined time period or longer.

Further, it is appropriate to determine that the running state of the vehicle is steady curve running when the road on which the vehicle is running is the curved path and the running state of the vehicle at the time is the steady turning state.

On the basis of the above-described knowledge, according to this device of Aspect 3, the estimation of the curve's radius using the amount of correction is enabled when the expected value of the curve's radius is equal to or below the predetermined value and a state of temporal variation of the curve's radius does not exceed the predetermined state for the predetermined time period or longer.

Therefore, according to this device of Aspect 3, the curve's radius is estimated using the actual yaw rate and the actual steering angle when the running state of the vehicle is not far off from a narrowly-defined steady turning state, and thereby the accuracy of the estimation of the curve's radius can be easily improved.

In this and the following aspects, the "expected value of the curve's radius" may be, for example, defined as the base value of the curve's radius or as the curve's radius estimated based on the actual steering angle.

Aspect 4 of the present invention is the curve's radius estimation device as described in Aspect 3, the estimator further comprising a setting part for setting the predetermined time period such that the predetermined time period is shortened as the actual vehicle speed increases.

The above-mentioned Aspect 3 can be implemented under a circumstance that the predetermined time period is a fixed value. Here, the "predetermined time period" corresponds to a distance of the curved path on which the vehicle has run.

On the other hand, the time period required for running a certain distance on the curved path is different for each actual vehicle speed. The faster the actual vehicle speed runs, the shorter the required time period becomes.

Also, in the case of making reference only to the base value (schematically corresponding to the actual yaw rate) of the curve's radius at a given instant, it is difficult to distinguish between the state in which the vehicle is running on the curved path and the state in which the vehicle is changing a lane on the straight path.

In contrast, in the case of determining whether the base value of the curve's radius continuously represents that the vehicle is under the turning state while the vehicle runs a certain distance, it can be made easy to distinguish between the state in which the vehicle turns for running on the curved path and the state in which the vehicle turns for changing the lane.

On the basis of the above-described knowledge, according to this device of Aspect 4, the predetermined time period is set such that it becomes shorter as the actual vehicle speed increases.

Therefore, according to this aspect, it can be avoided to falsely estimate the curve's radius when the vehicle is not actually running on the curved path.

Aspect 5 of the present invention is the curve's radius estimation device as described in Aspect 1, the estimator comprising an estimation part for estimating the curve's radius such that an estimate of the curve's radius responds to the variation of the actual steering angle more sensitively when an expected value of the curve's radius is relatively small than when it is relatively large.

As the actual curve's radius is small and the curved path is sharply bending, the response delay of the actual yaw rate to the variation of the actual steering angle is large, and therefore the actual yaw rate has a tendency not to accurately reflect the turning behavior of the vehicle.

Paying attention to this fact, according to this device of Aspect 5, the curve's radius is estimated such that the estimate of the curve's radius responds to the variation of the actual steering angle more sensitively when the expected value is relatively small than when it is relatively large.

Aspect 6 of the present invention is the curve's radius estimation device as described in Aspect 2, the estimator further comprising a part for determining an amount of correction for the base value using a product of an amount of variation of the base value per a certain range of the actual steering angle, an amount of variation of the actual steering angle per a certain time period, and a coefficient that increases as an expected value of the curve's radius decreases, and estimating the curve's radius by correcting the base value with the determined amount of correction.

According to this device of Aspect 6, in the case that the base value of the curve's radius estimated on the basis of the actual vehicle speed and the actual yaw rate but not of the actual steering angle is corrected based on the amount of variation of the base value per a certain range of the actual steering angle (that is the physical quantity regarding to the actual steering angle) and on the amount of the variation of the steering angle per a certain time period, an example of the estimation that the curve's radius is estimated such that the estimate of the curve's radius responds to the variation of the actual steering angle more sensitively when the expected value is relatively small than when it is relatively large is provided.

Aspect 7 of the present invention is a curve's radius estimation device for estimating a curve's radius of a road on which the vehicle shall run, comprising:

a vehicle speed sensor for detecting an actual speed of the vehicle;

a yaw rate sensor for detecting an actual yaw rate of the vehicle;

a steering angle sensor for detecting an angle of a steering wheel handled by a driver of the vehicle as an actual steering angle; and an estimator for estimating the curve's radius, the estimator comprising:

a first estimation part for estimating the curve's radius on the basis of the actual vehicle speed and the actual yaw rate but not of the actual steering angle as a first estimate;

a second estimation part for estimating the curve's radius on the basis of the actual vehicle speed, the actual yaw rate, and the actual steering angle as a second estimate; and a final value acquisition part for acquiring a final value of the estimate of the curve's radius using selectively or collectively those estimated first and second estimates.

As a technique for estimating the curve's radius, a first method for estimating the curve's radius as the first estimate on the basis of the actual vehicle speed and the actual yaw rate but not of the actual steering angle and a second method for estimating the curve's radius as the second estimate on the basis of the actual vehicle speed, the actual yaw rate, and the actual steering angle are considered. In the implementation of the second method, the feature described in any of the above Aspects 2-6 can be employed.

Since both of those first and second estimates are the estimates of the curve's radius, those are inherently matched to each other, and may be, however, different from each other depending on the running state of the vehicle. In the later case, one of the two estimates might represent a true curve's radius more accurately than the other, or a combined value of the two estimates might represent the true curve's radius more accurately than each of the two. In any case, the accuracy of the estimation may be easily improved using selectively or collectively the two estimates rather than outputting the same one of the two estimates as fixed.

On the basis of the above-described knowledge, according to this device of Aspect 7, the final value is acquired by using selectively or collectively the estimate on the basis of the actual vehicle speed and the actual yaw rate but not of the actual steering angle and the estimate on the basis of the actual vehicle speed, the actual yaw rate, and the actual steering angle.

Aspect 8 of the present invention is the curve's radius estimation device as described in Aspect 7, the final value acquisition part comprising a selection part for selecting the larger one of the first and second estimates as the final value of the curve's radius.

The first and second estimates are common in that those are acquired using the actual yaw rate. On the other hand, as described above, because of the response delay of the actual yaw rate, the estimate of the curve's radius acquired with the actual yaw rate has a tendency to be smaller than the actual value, for example, around the exit of the curved path.

Therefore, it is appropriate to conclude that the larger one of the first and second estimates reflects the actual curve's radius more accurately than the smaller one.

On the basis of the above-described knowledge, according to this device of Aspect 8, the larger one of the first and second estimates is selected as the final value of the curve's radius.

The device according to this Aspect 8 can be used with a determiner for determining whether there exists a preceding vehicle for which the present vehicle should make track, as described below in Aspect 18.

On the other hand, around the exit of the curved path, typically, it is not a curve of which curvature radius is steady, but a clothoid curve of which curvature radius is gradually increasingly. Therefore, in a circumstance that the present vehicle is running on the track of the preceding vehicle in the curved path, the curvature radius of the road on which the preceding vehicle is running is larger than the curvature radius of the road on which the present vehicle is running. It becomes larger as the present vehicle is far off from the preceding vehicle. Consequently, there is a difference between the curve's radius corresponding to the preceding vehicle and the curve's radius corresponding to the present vehicle.

According to this device of Aspect 8, around the exit of the curved path, the curve's radius estimated with both of the actual steering angle and the actual yaw rate is more likely selected rather than the curve's radius estimated with the actual yaw rate but not with the actual steering angle. Consequently, the curve's radius estimated in the present vehicle is made closer to the curve's radius corresponding to the preceding vehicle because the curve's radius is estimated taking into account steering information of which response is quick. If so, a degree of how easy to make track for the preceding vehicle is (ease to make track for or visibility of the preceding vehicle or ease to follow the preceding vehicle) for the present vehicle can be easily improved. In addition, this can be true for the device according to Aspect 1.

Aspect 9 of the present invention is the curve's radius estimation device as described in Aspect 7, the estimator further comprising an enabling part for enabling the acquisition of the second estimate when an expected value of the curve's radius is equal to or below a predetermined value and a state of temporal variation of the first estimate does not exceed a predetermined state for a predetermined time period or longer.

According to this device of Aspect 9, a working-effect similar to one of the device according to Aspect 3 is achieved.

Aspect 10 of the present invention is the curve's radius estimation device as described in Aspect 9, the estimator further comprising a setting part for setting the predetermined time period such that the predetermined time period is shortened as the actual vehicle speed increases.

According to this device of Aspect 10, a working-effect similar to one of the device according to Aspect 4 is achieved.

Aspect 11 of the present invention is the curve's radius estimation device as described in Aspect 7, the second estimation part comprising a part for acquiring the second estimate on the basis of an amount of variation of the first estimate per a certain range of the actual steering angle and an amount of variation of the actual steering angle per a certain time period.

Aspect 12 of the present invention is the curve's radius estimation device as described in Aspect 7, the second estimation part comprising a part for acquiring the second estimate using a product of an amount of variation of the first estimate per a certain range of the actual steering angle, an amount of variation of the actual steering angle per a certain time period, and a coefficient that increases as an expected value of the curve's radius decreases.

Aspect 13 of the present invention is the curve's radius estimation device as described in Aspect 7, the second estimation part comprising a part for determining an amount of correction for the first estimate using a product of an amount of variation of the first estimate per a certain range of the actual steering angle, an amount of variation of the actual steering angle per a certain time period, and a coefficient that increases as an expected value of the curve's radius decreases, and acquiring the second estimate by correcting the first estimate with the determined amount of correction.

According to these devices of Aspects 11-13, a working-effect similar to the one of the device according to Aspect 6 is achieved.

Aspect 14 of the present invention is the curve's radius estimation device as described in Aspect 7, the first estimation part comprising a part for acquiring an original value of the first estimate on the basis of the actual vehicle speed and the actual yaw rate but not of the actual steering angle, and filtering the acquired original value with a particular characteristic so as to acquire a final value of the first estimate, the particular characteristic being a low response characteristic to the original value in a region in which the vehicle running state is expected to be nearly a straight running state, and being a high response characteristic to the original value in a region in which the vehicle running state is expected to be nearly the turning state.

According to this device of Aspect 14, a working-effect similar to the one of a device according to below-mentioned Aspect 15 is achieved.

Aspect 15 of the present invention is a curve's radius estimation device for estimating a curve's radius of a road on which the vehicle shall run, comprising:

a vehicle speed sensor for detecting an actual speed of the vehicle;

a yaw rate sensor for detecting an actual yaw rate of the vehicle; and an estimator for acquiring an original value of the curve's radius on the basis of the actual vehicle speed detected by the vehicle speed sensor and the actual yaw rate detected by the yaw rate sensor, and filtering the acquired original value with a particular characteristic so as to acquire a final value of the curve's radius, the particular characteristic being a low response characteristic to the original value in a region where the vehicle running state being expected to be nearly a straight running state, and is a high response characteristic to the original value in a region where the vehicle running state is expected to be nearly a turning state.

The curve's radius of the road on which the vehicle shall run can be estimated with the actual yaw rate of the vehicle. The yaw rate sensor for detecting the actual yaw rate is typically designed to read a zero point as the detected value when the yaw moment taking place on the vehicle is zero (i.e. when the vehicle is running straight or stopped). However, the detected value of the actual yaw rate is, around its zero point, likely to be affected by the vibration of the vehicle body on which the yaw rate sensor is provided and by the internal noise of the yaw rate sensor and so on, and thereby likely to cause wobbling. Therefore, the errors in the estimates of the curve's radius based on the detected value of the yaw rate sensor is likely to take place because of the wobbling of the detected value of the yaw rate sensor when the running state of the vehicle is near the straight running state.

It is possible to filter the estimate of the curve's radius based on the detected value of the yaw rate sensor so as to reduce the errors in the estimation due to the wobbling.

However, if the characteristic of filtering, i.e. response of the filtered estimate to the estimate before being filtered, is set uniformly across the entire variable range of the estimate, the response of the estimate of the curve's radius to the actual variation of the curve's radius might be over-insensitive in the curved path of which curve's radius likely varies as the vehicle's traveling. In other words, it might be difficult for the filtered estimate to rapidly reflect the variation of the curve's radius.

Consequently, according to this device of Aspect 15, the original value of the curve's radius is acquired on the basis of the actual vehicle speed and the actual yaw rate, and the acquired original value is filtered so as to acquire the final value of the curve's radius with the particular characteristic that is a low response to the original value in the region where the vehicle running state is expected to be nearly the straight running state and that is a high response to the original value in the region where the vehicle running state is expected to be nearly the turning state. Herewith, the curve's radius is estimated.

Therefore, according to this device of Aspect 15, reducing the errors in the estimation due to the wobbling of the detected value of the yaw rate sensor and improving the response of the estimate of the curve's radius to the actual variation of the curve's radius in the region where the vehicle running state is expected to be near the turning state can both be easily achieved.

The technical feature according to this aspect can be employed in the device for estimating the curve's radius on the basis of the actual vehicle speed, the actual yaw rate, and the actual steering angle, like the device according to Aspect 1.

Aspect 16 of the present invention is the curve's radius estimation device as described in any of Aspects 1-15, the estimator comprising a determination part for determining that the vehicle is under a straight running state when the actual vehicle speed is equal to or below a predetermined speed regardless of detected values of the actual yaw rate.

In the case that the actual vehicle speed is very slow (e.g. equal to or below 10 kilometers per hour) it is typically difficult for the yaw rate sensor for detecting the actual yaw rate to accurately detect the yaw moment because its output is minute and S/N ratio of the yaw rate sensor is low. Thus, in such case, it is likely to be difficult to estimate the curve's radius using the actual yaw rate with high accuracy.

On the other hand, from a practical view of other devices using the estimate of the curve's radius in the vehicle, it is often the case that a less accurate estimate of the curve's radius is sufficient when the actual vehicle speed is very slow compared to when it is not.

On the basis of the above-described knowledge, according to this device of Aspect 16, it is determined that the vehicle is under the straight running state when the actual vehicle speed is equal to or below the predetermined speed regardless of the detected values of the actual yaw rate.

Therefore, according to this device of Aspect 16, the other devices for using the detected value of the yaw rate sensor are not affected by the effect of wobbling.

Aspect 17 of the present invention is a curve's radius estimation device for estimating a curve's radius of a road on which the vehicle shall run, comprising:

a vehicle speed sensor for detecting an actual vehicle speed of the vehicle;

a turning state quantity sensor for detecting a turning state quantity representing the turning state of the vehicle; and an estimator for estimating the curve's radius on the basis of at least the turning state quantity of the actual vehicle speed detected by the vehicle speed sensor and the turning state quantity detected by the turning state quantity sensor, the estimator determining that the vehicle is under a straight running state when the actual vehicle speed is equal to or below a predetermined speed regardless of detected values of the actual yaw rate.

According to this device of Aspect 17, a working-effect similar to one of a device according to Aspect 16 is achieved.

In Aspect 17, the "turning state quantity sensor" may be, for example, the yaw rate sensor, the steering angle sensor, a lateral acceleration sensor for detecting lateral force acting on wheels of the vehicle, an amount of load shift sensor for detecting the amount of load shift in a lateral direction on the vehicle, and so on.

Aspect 18 of the present invention is a preceding vehicle existence determination apparatus comprising:

the curve's radius estimation device described in any of Aspects 1-17;

a sensor provided in the vehicle for detecting an object located in front of the vehicle; and a determiner for determining a present lane probability in which a preceding vehicle is running on the same lane with the present vehicle when the object detected by the sensor is a moving object that is the preceding vehicle, and determining that there exists a preceding vehicle for which the present vehicle should make track when the determined present lane probability is equal to or exceeds a predetermined probability, the determiner determining the present lane probability on the basis of output signals of the sensor and the curve's radius estimated by the curve's radius estimation device in accordance with a predetermined relationship between at least one of a first and second distance and the present lane probability, and, the first distance representing how far the preceding vehicle is out of the lane in a lane-width direction, and the second distance representing how far the preceding vehicle is away from the present vehicle along the lane in a vehicle traveling direction.

According to this apparatus of Aspect 18, since it can be possible to determine whether there exists a preceding vehicle for which the present vehicle should make track with the estimate of the curve's radius in which the error is reduced, it can be easily achieved to make rapid and certain detection of a preceding vehicle for tracking.

BRIEF DESCRIPTION OF THE DRAWINGS

These and other aspects, and other objects, features and advantages of the present invention will become more apparent from the following detailed description when read in conjunction with the accompanying drawings, in which:

FIG. 10 is a flowchart conceptually showing contents of a curve's radius estimation program executed by a computer of the inter-vehicle distance control ECU 50 in FIG. 9.

DETAILED DESCRIPTION OF THE PREFERRED EMBODIMENTS

Figure 1:
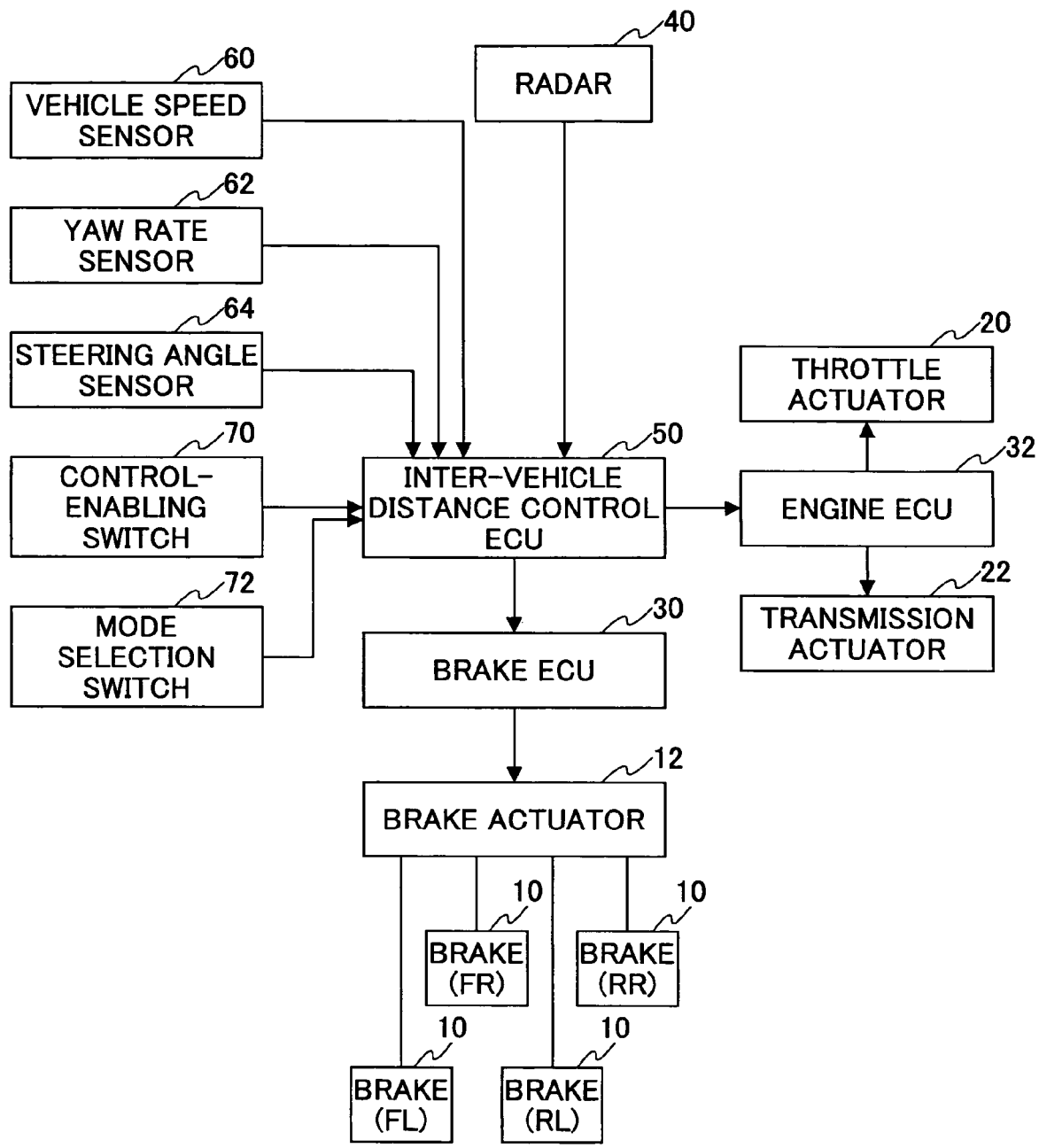
FIG. 1 is a block diagram showing a configuration of an inter-vehicle distance control apparatus including a curve's radius estimation device according to a first embodiment of the present invention.

There is shown in FIG. 1 the block diagram showing the configuration of the inter-vehicle distance control apparatus including the curve's radius estimation device according to the first embodiment of the present invention.

This inter-vehicle distance control apparatus is carried on a vehicle. The vehicle is driven by transmitting a driving force of an engine (or a motor) as a source of power via a transmission (such as a stepped variable or continuously variable type) to a plurality of driving wheels.

The vehicle is provided with brakes 10 (such as friction or regenerative braking type) for braking each of a plurality of wheels including the plurality of driving wheels. The plurality of wheels include right and left front wheels and right and left rear wheels. In FIG. 1, FL, FR, RL, and RR represent the left front wheel, the right front wheel, the left rear wheel, and the right rear wheel, respectively. The vehicle is provided with a brake actuator 12 (such as motor-driven or electromagnetic pressure control type) for electrically controlling each of the brakes 10 of the wheels.

The engine is provided with a throttle within its intake manifold. Engine power is varied depending on opening of the throttle. The throttle opening can be electrically controlled by a throttle actuator 20 (such as an electric motor).

In the transmission, change gear ratio between an input shaft and an output shaft of the transmission is varied. A transmission actuator 22 (such as a solenoid) is provided for electrically controlling the change gear ratio.

The vehicle is further provided with a brake ECU (Electronic Control Unit) 30 for controlling the brakes 10 through the brake actuator 12 as well as an engine ECU 32 for controlling the engine and the transmission through the throttle actuator 20 and the transmission actuator 22, respectively. The brake ECU 30 and the engine ECU 32 consist mainly of computers including CPU, ROM, and RAM. The same is true for below-mentioned other ECUs.

As shown in FIG. 1, the inter-vehicle distance control apparatus according to this embodiment is provided with a radar 40 as a sensor for detecting an object located in front of the vehicle. The radar 40 is a device to detect a distance and a relative direction from the vehicle to a target object by emitting electromagnetic waves (including light, sound, and the like) and then receiving, among the emitted electromagnetic waves, electromagnetic waves reflected from the target object in a detectable zone of the radar 40. The radar 40 can cover the entire region of the detectable zone forming approximately a sector by oscillating beams of the electromagnetic waves right and left within a predetermined angle range in a direction crossing its traveling direction so as to scan a forward zone ahead of the radar 40.

Figure 2:
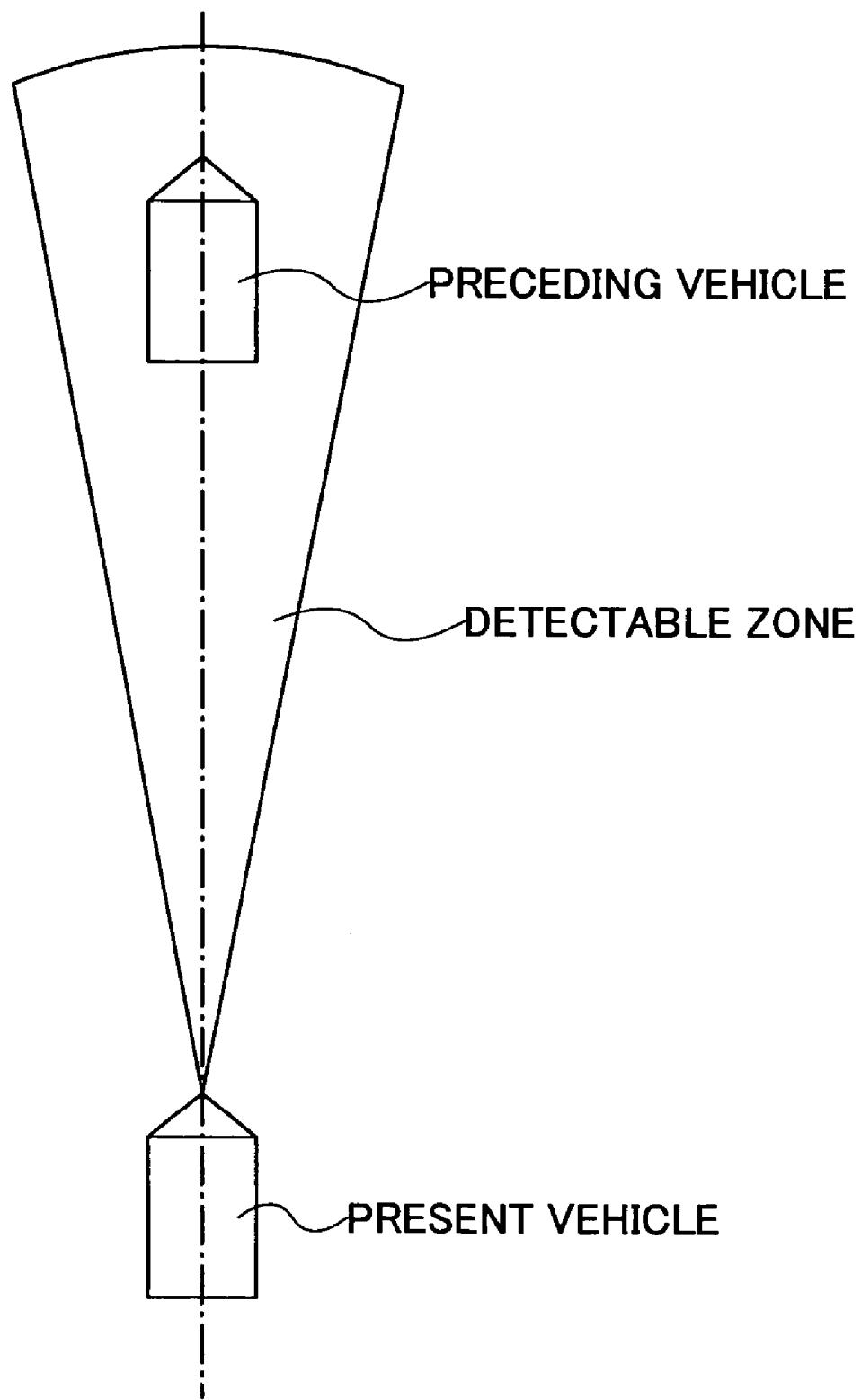
FIG. 2 is a plan view conceptually showing how a preceding vehicle is detected by a radar 40 in FIG. 1.

If the target object detected by the radar 40 is a preceding vehicle, the radar 40 will detect an inter-vehicle distance that is a distance from the present vehicle to the preceding vehicle and a direction of the preceding vehicle relative to the present vehicle. FIG. 2 shows a case wherein there is one preceding vehicle within the detectable zone of the radar 40 of the present vehicle.

The electromagnetic waves emitted by the radar 40 can be, for example, lasers (such as laser beams) and millimeter waves. By the way, any vehicle includes a pair of reflectors spaced apart on both side of a rear face of the vehicle. The radar 40 can use the reflection from the pair of reflectors on each vehicle to identify each vehicle from among the other vehicles in its detectable zone.

The inter-vehicle distance control ECU 50 for controlling the traveling of the vehicle to make the inter-vehicle distance between the present vehicle and the preceding vehicle closer to a target distance on the basis of output signals from the radar 40 is provided, as shown in FIG. 1, in the inter-vehicle distance control apparatus.

For deceleration of the vehicle, the inter-vehicle distance control ECU 50 basically controls a braking application force through the brake ECU 30 and the brake actuator 12, while for acceleration, the ECU 32 controls the throttle opening and the change gear ratio through the throttle actuator 20 and the transmission actuator 22.

As shown in FIG. 1, the inter-vehicle distance control apparatus according to this embodiment is further provided with a vehicle speed sensor 60, a yaw rate sensor 62, and a steering angle sensor 64.

The vehicle speed sensor 60 is a sensor for detecting the speed of the vehicle by actual measurement or estimation. The vehicle speed sensor 60 may include a plurality of wheel speed sensors for detecting a wheel speed for each wheel and may estimate the vehicle speed of the vehicle using output signals from those sensors.

The yaw rate sensor 62 is a sensor for detecting yaw rate actually taking place on the vehicle. The yaw rate sensor 62 may include a tuning-fork type transducer and may detect the yaw rate of the vehicle by detecting a strain generated in the transducer on the basis of yaw moment of the vehicle.

The steering angle sensor 64 is a sensor for detecting an angle of the steering wheel handled by the driver of the vehicle.

As shown in FIG. 1, the inter-vehicle distance control apparatus according to this embodiment is further provided with a control-enabling switch 70, and a mode selection switch 72.

The control-enabling switch 70 is a switch for the driver to input an indication of whether the inter-vehicle distance control is enabled into the inter-vehicle distance control ECU 50.

The mode selection switch 72 is a switch for the driver to select a desired control mode from a plurality of control modes provided for the inter-vehicle distance control.

The above plurality of control modes may be, for example, provided for different inter-vehicle time periods. Here, the inter-vehicle time period is a time period expected to elapse from a point of time at which the preceding vehicle passes through a point of location to a point of time at which the present vehicle passes through the same point of location. In this case, those control modes can be, for example, defined as a long-time control mode for controlling the inter-vehicle distance such that a relatively long inter-vehicle distance is kept between the preceding vehicle and the present vehicle so as to achieve a relatively long inter-vehicle time period, a short-time control mode for controlling the inter-vehicle distance such that a relatively short inter-vehicle distance is kept so as to achieve a relatively short inter-vehicle time period, and an intermediate-time control mode between these two modes.

In this embodiment, the traveling of the vehicle is controlled by the inter-vehicle distance control using the radar 40 such that the present vehicle follows the preceding vehicle with a predetermined inter-vehicle distance. In other words, the present vehicle automatically makes track for the preceding vehicle by means of the inter-vehicle distance control.

When the present vehicle transits from a state for tracking the preceding vehicle in this way to a state for losing it, i.e. to a state wherein the preceding vehicle changes lanes from the traveling lane of the present vehicle to another, in this embodiment, by the inter-vehicle distance control, the present vehicle is automatically accelerated until the actual vehicle speed reaches a target speed, and then constantly maintains this predetermined speed.

The software configuration of the inter-vehicle distance control apparatus according to this embodiment is next explained.

Figure 3:
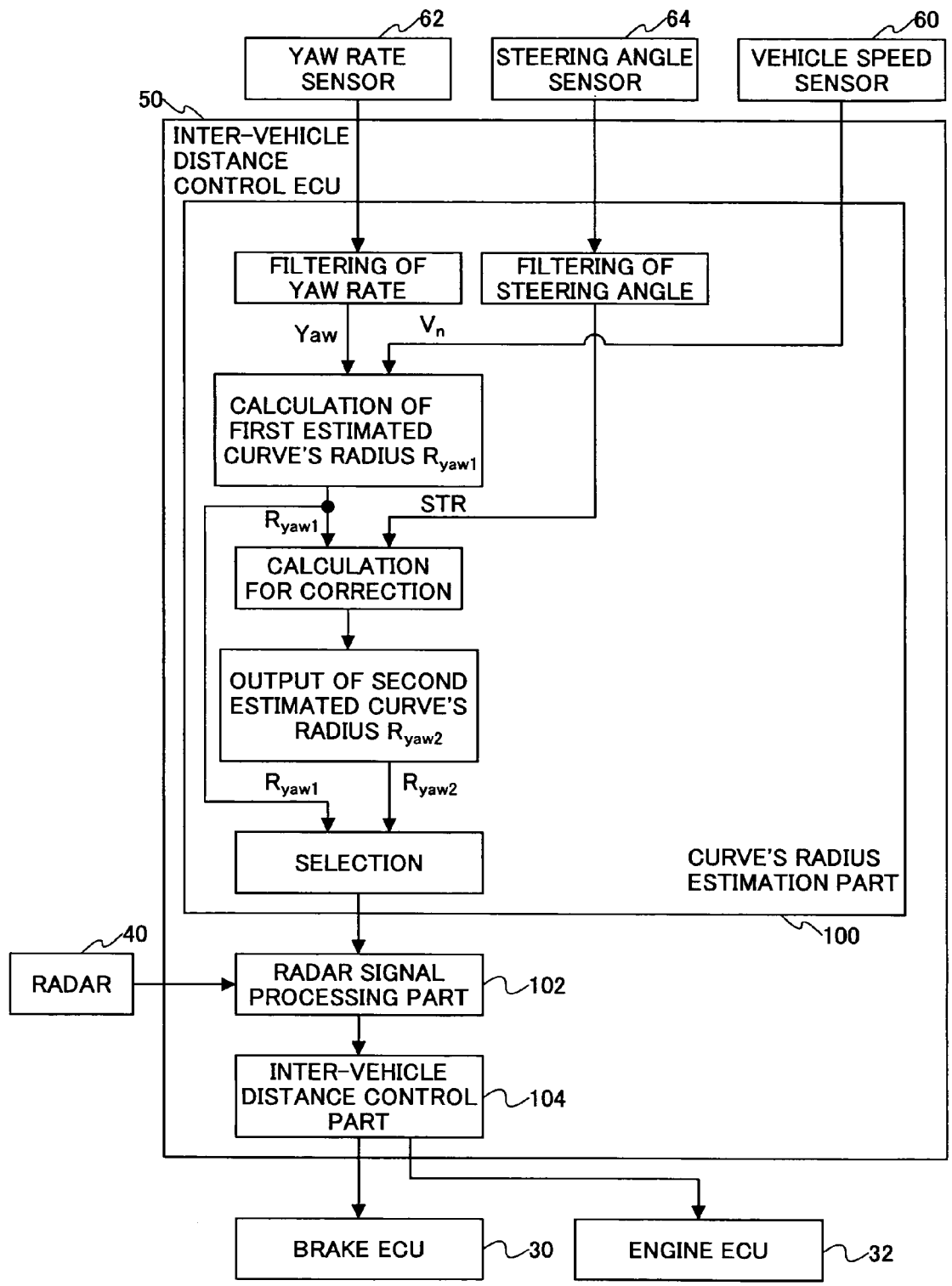
FIG. 3 is a function block diagram conceptually showing a software configuration of an inter-vehicle distance control ECU 50 in FIG. 1.

FIG. 3 conceptually shows the software configuration of the inter-vehicle distance control ECU 50 in a function block diagram form. As shown in FIG. 3, focusing attention on the features, the inter-vehicle distance control ECU 50 includes a curve's radius estimation part 100, a radar signal processing part 102, and an inter-vehicle distance control part 104.

The curve's radius estimation part 100 is connected to the yaw rate sensor 62, the steering angle sensor 64, and the vehicle speed sensor 60. The radar signal processing part 102 is connected to the radar 40. The inter-vehicle distance control part 104 is connected to the engine ECU 32 and to the brake ECU 30.

The curve's radius estimation part 100 is a part for estimating the curve's radius. The estimated curve's radius is used for determining whether a vehicle acquired by the radar 40 is the preceding vehicle traveling on the same lane with the present vehicle and whether the acquired vehicle is a vehicle for which the present vehicle should make track.

When focusing attention on steady turning behavior of the vehicle, the traveling direction of the vehicle, i.e. the radius of the curved path on which the vehicle is running, is reflected more accurately in the yaw rate than in the steering angle. The reason is that, when the curve's radius is estimated from the steering angle, it is difficult to accurately estimate the curve's radius without taking into account the vehicle characteristics information (including stability factors), whereas, when the curve's radius is estimated from the yaw rate, it is rational to use the yaw rate as a physical quantity reflecting such vehicle characteristics information.

However, when focusing attention on transitional turning behavior of the vehicle, since the steering angle is a causal physical quantity of the vehicle's turning behavior, it is easy to estimate the vehicle's turning behavior, i.e. the curve's radius, without delay, by checking the steering angle. In contrast, since the yaw rate is a physical quantity representing the result of the vehicle's turning behavior, it is not necessarily possible to accurately estimate the vehicle's turning behavior, i.e. the curve's radius, at a given instant, by checking the yaw rate.

Figure 4:
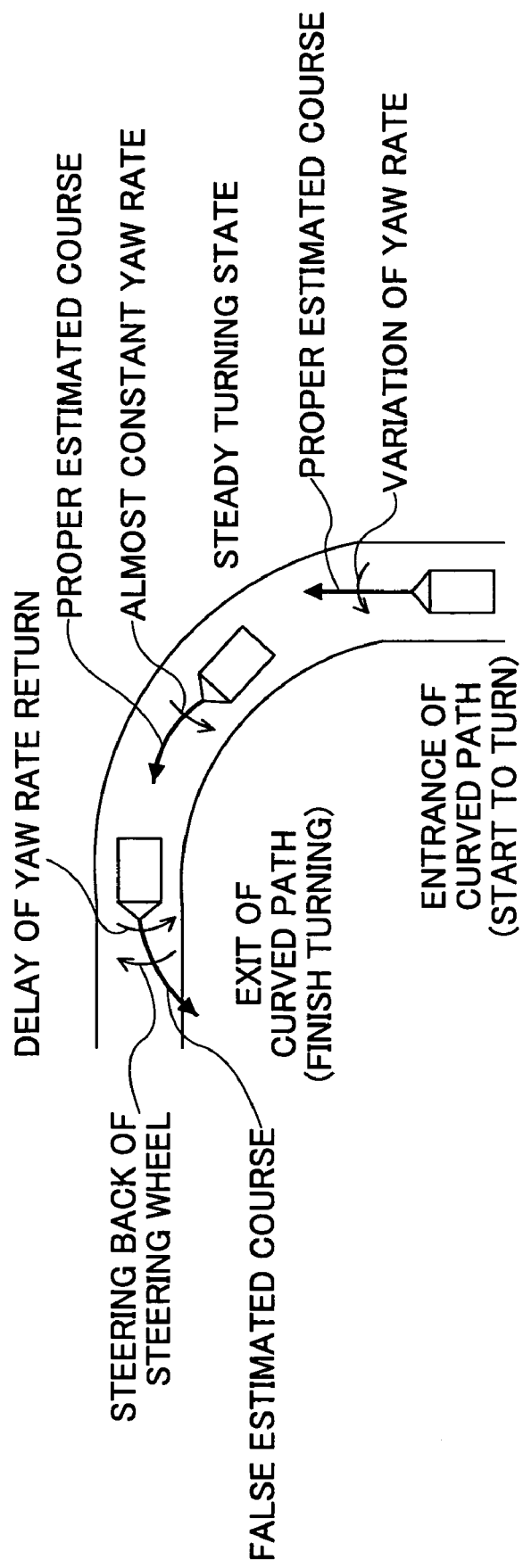
FIG. 4 is a plan view illustrating why a traveling path estimated on the basis of the yaw rate of the vehicle has an error around the exit of the curved path.

The traveling on the curved path by the vehicle between approaching to the entrance and departing from the exit of the curved path is conceptually illustrated in FIG. 4, with attention focused on an estimated traveling path having the estimated curve's radius acquired by making reference to the yaw rate, the yaw rate, and the handling of the steering wheel.

After the vehicle approaches the entrance of the curved path and starts to turn, the yaw rate varies.

Then, the vehicle transits to the steady turning state. During this state, the yaw rate is kept almost constant, and the course of the vehicle is accurately estimated on the basis of it. In other words, the estimated curve's radius obtained by making reference to the yaw rate accurately reflects the true curve's radius.

Thereafter, when the vehicle approaches the exit of the curved path and is about to stop turning, the steering wheel is steered back to the neutral position by the driver. It takes time for the accompanying variation of the vehicle's behavior in the yaw rate to appear. In other words, return of the yaw rate has a tendency to be delayed compared to the steering back of the steering wheel. Therefore, if the curve's radius is estimated by making reference to the yaw rate around the exit of the curved path, there is a tendency to incorrectly estimate the course indicating that the same curved path still continues, even though the curve's radius actually increases as the road makes the transition from the curved path to the straight path.

Thus, this embodiment takes advantage of estimating the curve's radius by making reference to the yaw rate, while addressing the drawback in such estimation by making reference to the steering angle, thereby being able to accurately estimate the curve's radius.

More specifically, the curve's radius estimation part 100 compares a first estimated curve's radius based on the yaw rate and the vehicle speed and a second estimated curve's radius that is obtained by correcting the first estimated curve's radius based on the steering angle. The curve's radius estimation part 100 then selects the larger one of those estimated curve's radii as a final estimated curve's radius, considering it to be closer to the true curve's radius.

Consequently, under traveling circumstances wherein there is a delay in the variation of the yaw rate in response to the variation of the vehicle behavior, such as when traveling around the exit of the curved path, such response delay due to the estimation of the curve's radius by making reference to the yaw rate is countervailed when the curve's radius is estimated.

This is described in more detail with reference to FIG. 3. A former yaw rate, which is detected by the yaw rate sensor 62, is filtered and loaded to the curve's radius estimation part 100 as the yaw rate Yaw. Similarly, a former steering angle, which is detected by the steering angle sensor 64, is filtered and loaded to the curve's radius estimation part 100 as the steering angle STR. On the basis of the loaded yaw rate Yaw and the vehicle speed $V_n$ detected by the vehicle speed sensor 60, the first estimated curve's radius $R_{yaw1}$ (which is an example of said base value as well as of said first estimate) is calculated in accordance with logic detailed below.

The calculated first estimated curve's radius $R_{yaw1}$ is then corrected based on the loaded steering angle STR, and the resultant corrected value is output as the second estimated curve's radius $R_{yaw2}$ (which is an example of said second estimate).

Subsequently, the larger one of the output second estimated curve's radius $R_{yaw2}$ and the calculated first curve's radius $R_{yaw1}$ is selected as a final estimated curve's radius R (which is an example of said final value). This final curve's radius R is supplied to the radar signal processing part 102 for processing the output signals of the radar 40.

The radar signal processing part 102 calculates the shape of the course, on which the present vehicle will run, on the basis of the supplied curve's radius R, and determines whether the preceding vehicle, for which the present vehicle should make track, is acquired by the radar 40.

The inter-vehicle distance control part 104 then transmits a signal to the engine ECU 32 and the brake ECU 30 on the basis of various types of traveling information such as the inter-vehicle distance between the preceding vehicle and the present vehicle acquired in the above-mentioned way, which signal is for controlling the traveling of the present vehicle such that the present vehicle makes track for the preceding vehicle while keeping a predetermined inter-vehicle distance between them.

Figure 5:
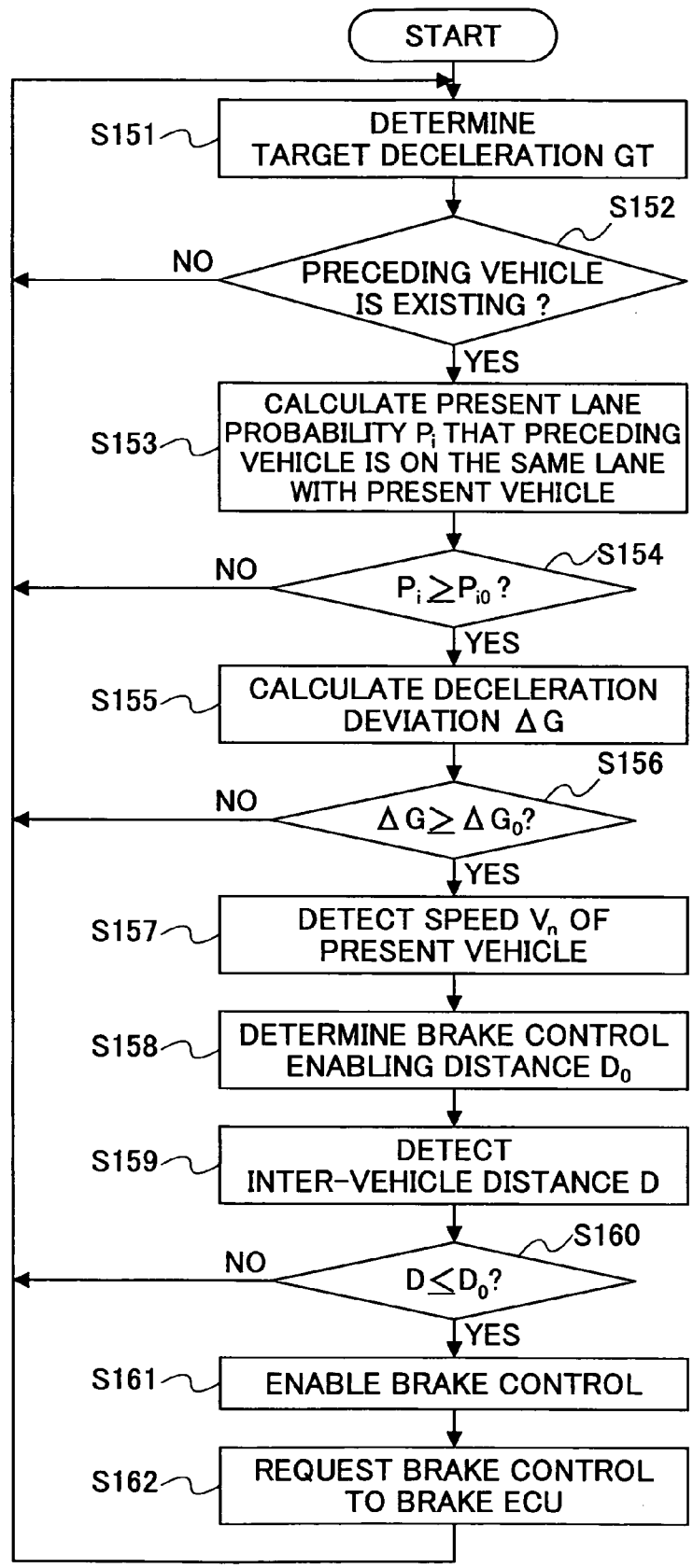
FIG. 5 is a flowchart conceptually showing contents of a deceleration control program executed by a computer of the inter-vehicle distance control ECU 50 in FIG. 1.

Various types of programs are pre-stored in the ROM of the computer in the inter-vehicle distance control ECU 50 so as to perform the above-mentioned inter-vehicle distance control. FIG. 5 conceptually shows the content of the deceleration control program, which is one of those pre-stored programs, in a flowchart form. Portions of the deceleration control program, which are not essential to understanding the present invention, are omitted.

In this deceleration control program, in step S151 (designated merely "S151" hereinafter, and the same applies to the other steps), a target deceleration GT of the vehicle is calculated on the basis of the inter-vehicle distance information. A relationship between the inter-vehicle distance and the target deceleration GT is pre-stored in the ROM in a form such as map, table, and the like. In accordance with this relationship, the target deceleration GT corresponding to current inter-vehicle distance information is determined to be current target deceleration GT.

Here, the "inter-vehicle distance information" can be defined, for example, to include both relative speed $V_r$ of the preceding vehicle to the present vehicle and the above-mentioned inter-vehicle time period T.

Also, here, the "relative speed $V_r$" indicates that the inter-vehicle distance between the preceding vehicle and the present vehicle is increasing when its sign is positive, and that the inter-vehicle distance between the preceding vehicle and the present vehicle is decreasing when its sign is negative.

In other words, the relative speed $V_r$ is an example of a physical quantity indicating whether the current relative position of the present vehicle to the preceding vehicle is shifted from the previous relative position in a direction so that the present vehicle gets closer to the preceding vehicle or the present vehicle gets further away from the preceding vehicle, i.e. a direction of relative movement of the present vehicle to the preceding vehicle, as well as indicating the degree of the relative movement.

In contrast, with regard to the "inter-vehicle time period T", comparing a long inter-vehicle time period T and a short inter-vehicle time period T under the same vehicle speed, the longer the inter-vehicle time period T becomes, the longer the inter-vehicle distance becomes. It is desirable for a proper inter-vehicle distance to be a variable value depending on the vehicle speed rather than a constant value. Consequently, it is then required to make reference to the vehicle speed to determine whether the proper inter-vehicle distance is relatively long or short. In contrast, employing the inter-vehicle time period T, it becomes possible to represent how much the driver of the present vehicle should pay attention to avoid crashing with the preceding vehicle by only the inter-vehicle time period T itself. Thus, the inter-vehicle time period T is a parameter to represent the feeling of the driver more faithfully.

In other words, the inter-vehicle time period T is an example of a physical quantity indicating whether an actual relative position of the present vehicle to the preceding vehicle is shifted from a target relative position in a direction so that the present vehicle gets closer to the preceding vehicle or so that the present vehicle gets further away from the preceding vehicle, i.e. a direction of deviation (error) of the relative positions, as well as indicating the degree of the relative movement.

Then, in S152, it is determined on the basis of the output signal of the radar 40 whether there exists a preceding vehicle ahead of the present vehicle. More specifically, it is determined whether an object ahead of the present vehicle acquired by the radar 40 is a moving object that is moving together with the present vehicle.

In the case that there is no preceding vehicle, the determination at S152 is NO and the process returns to S151. In the case that there exists a preceding vehicle, the determination at S152 is YES and the process proceeds to S153.

At S153, a present lane probability $P_i$, which is the probability that the preceding vehicle exists on the same lane with the present vehicle, is calculated. The present lane probability $P_i$ is based on either or both of a first distance and a second distance, and is calculated in accordance with a relationship predetermined between either or both of the first and second distances and the present lane probability $P_i$, where the first distance represents how far a point (one point representative of the preceding vehicle such as a middle position between a pair of reflectors in the preceding vehicle) of the preceding vehicle acquired by the radar 40 is out of the present lane in a vehicle-width direction, and where the second distance represents how far the position of the preceding vehicle is away from the present vehicle along the present lane in a vehicle traveling direction. An example of this calculation is described in said Japanese Laid-Open Patent Application No. 2001-328451.

At S153, it is necessary to estimate the curve's radius of the road on which the present vehicle shall run so as to expect a portion to run in the present lane on which the present vehicle is running, i.e. a traveling trajectory that the present vehicle is describing. To perform this estimation, the curve's radius estimation program is also pre-stored in the ROM of the computer in the inter-vehicle distance control ECU 50. This curve's radius estimation program is described in more detail below.

Subsequently, at S154, it is determined whether said calculated present lane probability $P_i$ is equal to or exceeds a threshold value $P_{i0}$. In the case that $P_i$ is below the threshold value $P_{i0}$, the determination at S154 is NO and the process returns to S151. In the case that $P_i$ is equal to or exceeds $P_{i0}$, the determination at S154 is YES and the process proceeds to S155.

At S155, deviation of the decelerations $\Delta G$ is calculated. The deceleration deviation $\Delta G$ is calculated by subtracting the target deceleration GT from an actual deceleration GR. Then, at S156, it is determined whether the calculated deceleration deviation $\Delta G$ is equal to or exceeds a threshold value $\Delta G_0$. In the case that $\Delta G$ is below the threshold value $\Delta G_0$, the determination at S156 is NO and the process returns to S151. In the case that $\Delta G$ is equal to or exceeds $\Delta G_0$, the determination at S156 is YES and the process proceeds to S157.

At S157, the vehicle speed $V_n$ of the present vehicle is detected by the vehicle speed sensor 60. Then, at S158, a brake control enabling distance $D_0$ is determined on the basis of the detected vehicle speed $V_n$. This brake control enabling distance $D_0$ is predetermined such that it is unnecessary to have the present vehicle decelerating by the brake control when the inter-vehicle distance D is longer than $D_0$, while it is necessary when D is equal to or below $D_0$.

Figure 6:
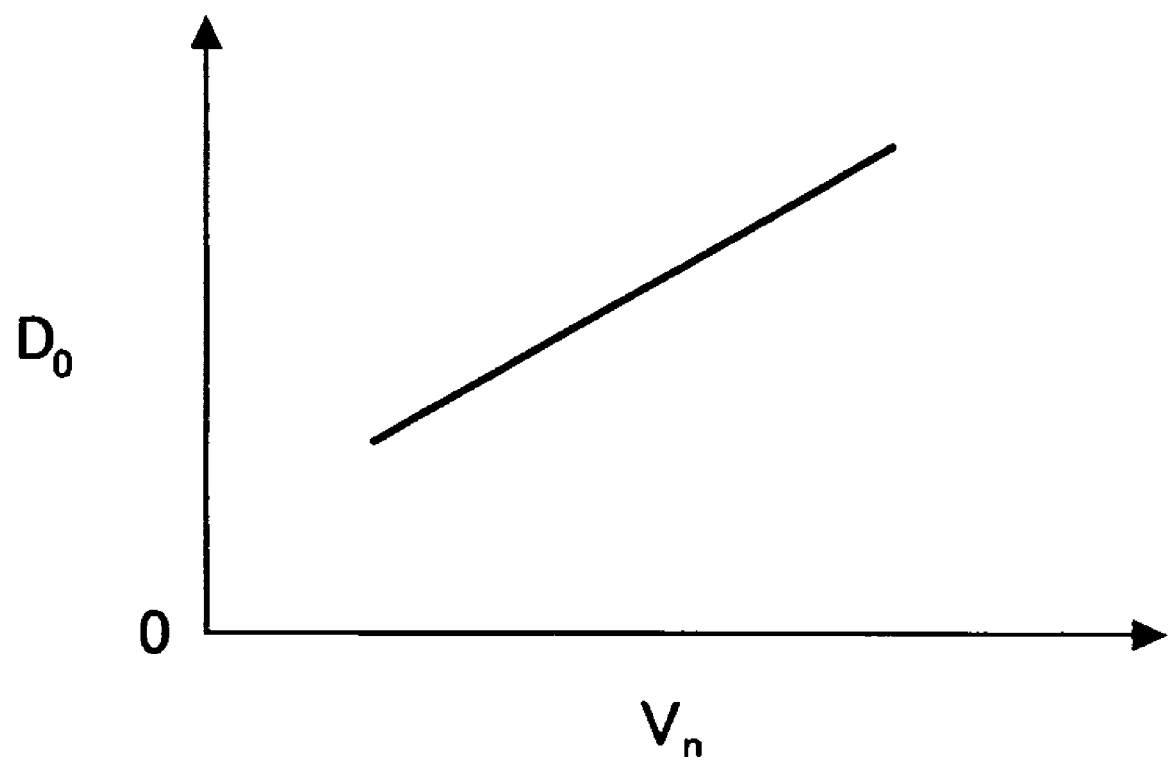
FIG. 6 is a graph illustrating a relationship between a vehicle speed $V_n$ and a brake control enabling distance $D_0$ in the deceleration control program in FIG. 5.

The brake control enabling distance $D_0$ is determined such that it increases together with the vehicle speed $V_n$, as illustrated in FIG. 6 in a graph form.

Therefore, according to this embodiment, since the brake control enabling distance $D_0$ extends as the vehicle speed $V_n$ increases, timing to initiate the brake control is earlier during relatively high-speed running than during relatively low-speed running of the vehicle. Consequently, reliability of the inter-vehicle distance control and feeling of relief comfort of the driver is improved.

Subsequently, at S159 in FIG. 5, the inter-vehicle distance D is detected by the radar 40. Then, at S160, it is determined whether the detected inter-vehicle distance D is equal to or below the determined brake control enabling distance $D_0$.

In the case that the inter-vehicle distance D exceeds the brake control enabling distance $D_0$, the determination at S160 is NO and the process returns to S151. In the case that the inter-vehicle distance D is equal to or below the brake control enabling distance $D_0$, the determination at S160 is YES. The brake control is then enabled at S161, and the brake control is requested to the brake ECU 30 at S162. Consequently, the present vehicle is decelerated by the brake ECU 30 so as to achieve the target deceleration GT.

With this, one routine of the brake control enabling determination program is completed.

Figure 7:
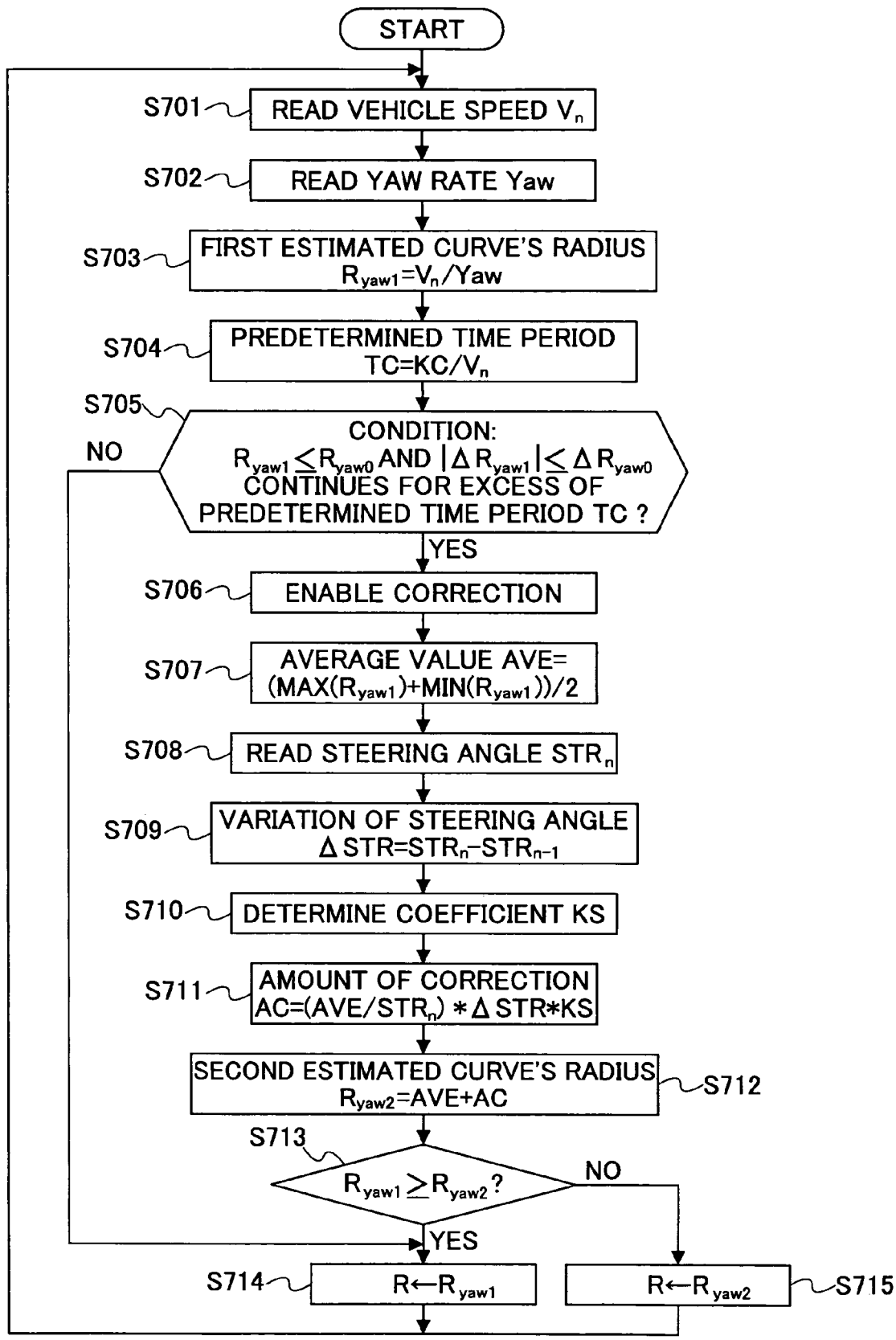
FIG. 7 is a flowchart conceptually showing contents of a curve's radius estimation program executed by a computer of the inter-vehicle distance control ECU 50 in FIG. 1.

The content of the curve's radius estimation program is conceptually shown in FIG. 7 in a flow chart form. Portions of the curve's radius estimation program, which are not essential to understanding the present invention, are omitted.

In other words, in this embodiment, the curve's radius estimation part 100 consists of a portion of the inter-vehicle distance control ECU 50, which portion is for executing the curve's radius estimation program.

In the curve's radius estimation program, at S701, the vehicle speed $V_n$ of the vehicle is read. Then, at S702, the yaw rate Yaw is given a necessary filtering process and is read from the yaw rate sensor 62.

Subsequently, at S703, using those read vehicle speed $V_n$ and yaw rate Yaw, the first estimated curve's radius $R_{yaw1}$ is acquired. This first estimated curve's radius $R_{yaw1}$ may be acquired, for example, by dividing the vehicle speed $V_n$ by the yaw rate Yaw.

Then, at S704, a predetermined time period TC for which the vehicle needs to run on a curved path having a certain distance is determined. The predetermined time period TC may be determined, for example, by dividing a constant KC by the vehicle speed $V_n$. Here, the "constant KC" means a distance that the vehicle must run to accurately detect the fact that the vehicle is under steady-state curve running on the same curved path.

Subsequently, at S705, it is determined whether the vehicle is under the steady-state curve running. More specifically, it is determined whether a particular condition continues in excess of said determined predetermined time period TC, where the particular condition is that said first estimated curve's radius $R_{yaw1}$ (which is an example of said expected value) is equal to or below a predetermined value $R_{yaw0}$, and that an absolute value of the maximum fluctuation band $\Delta R_{yaw1}$ of the first estimated curve's radius $R_{yaw1}$ (which is an example of said base value as well as of said first estimate) is equal to or below a predetermined value $\Delta R_{yaw0}$ (which is an example of said predetermined state).

Here, the condition that the absolute value of the maximum fluctuation band $\Delta R_{yaw1}$ of the first estimated curve's radius $R_{yaw1}$ is equal to or below the predetermined value $\Delta R_{yaw0}$ means a condition that is realized about the first estimated curve's radius $R_{yaw1}$ when the running state of the vehicle is substantially steady-state.

In the case that the condition, which is that the first estimated curve's radius $R_{yaw1}$ is equal to or below the predetermined value $R_{yaw0}$ and that the absolute value of the maximum fluctuation band $\Delta R_{yaw1}$ of the first estimated curve's radius $R_{yaw1}$ is equal to or below the predetermined value $\Delta R_{yaw0}$, does not continue in excess of the predetermined time period TC, the determination is NO and the first estimated curve's radius $R_{yaw1}$ is the final curve's radius R at S714. With this, one routine of the curve's radius estimation program is completed.

In contrast, if the above condition continues in excess of the predetermined time period TC, correction for the first estimated curve's radius $R_{yaw1}$ is enabled at S706.

Subsequently, at S707, an average value AVE between a maximum value $MAX(R_{yaw1})$ and a minimum value $MIN(R_{yaw1})$ of a plurality of the first estimated curve's radii $R_{yaw1}$ is acquired (by repeatedly performing S701-S703) within the predetermined time period TC. This average value AVE is an example representative of those first estimated curve's radii $R_{yaw1}$.

Then, at S708, the steering angle STR is given a necessary filtering process and is read from the steering angle sensor 64. Subsequently, at S709, variation of the steering angle ΔSTR is calculated by subtracting a previous $STR_{n-1}$ from the read current steering angle $STR_n$.

Figure 8:
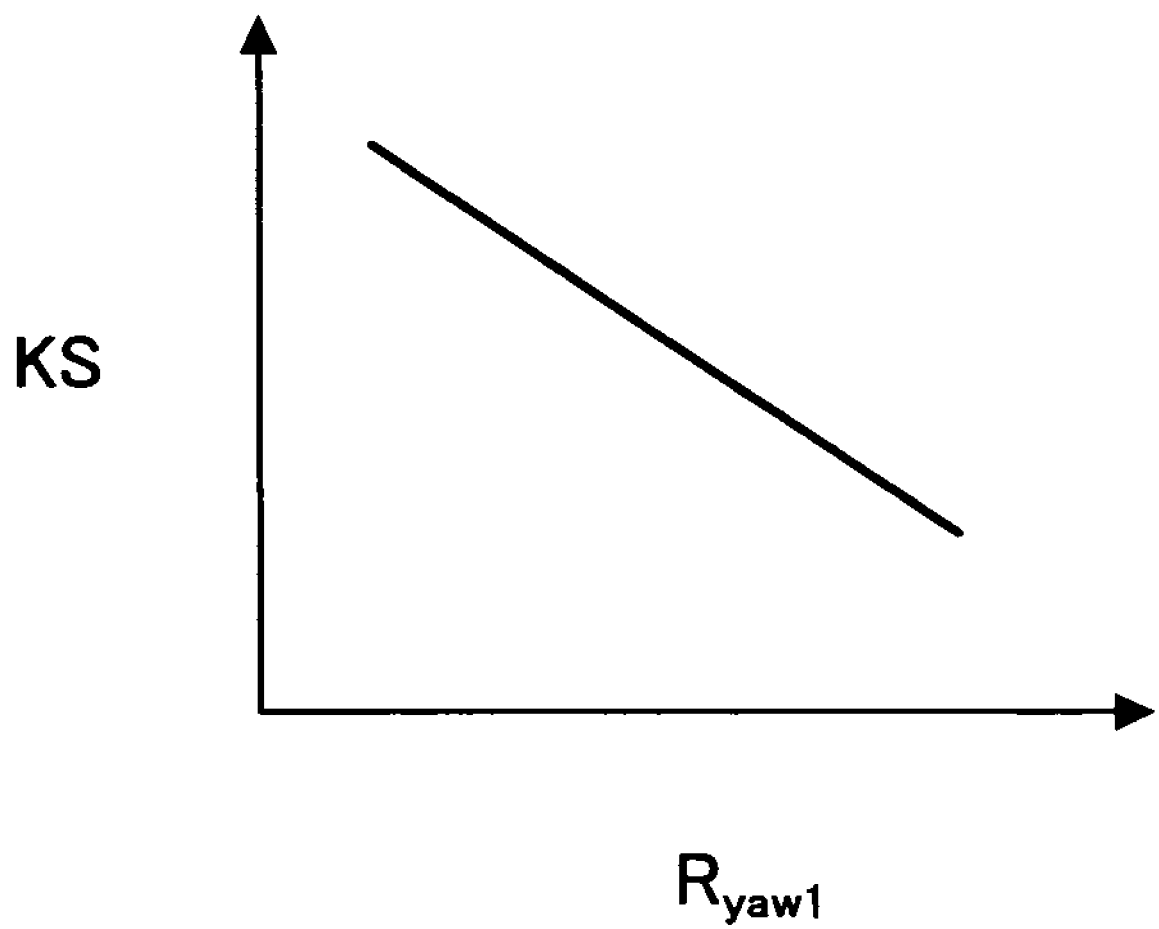
FIG. 8 is a graph illustrating a relationship between a first estimated curve's radius $R_{yaw1}$ and a coefficient KS in the curve's radius estimation program in FIG. 7.

Then, at S710, the coefficient KS is determined depending on the first estimated curve's radius $R_{yaw1}$. The coefficient KS may be defined, for example, such that it increases as the first estimated curve's radius $R_{yaw1}$ decreases (i.e. as the road on which the vehicle is running approaches the curved path from the straight path), as illustrated conceptually in FIG. 8 in a graph form.

As detailed below, in this embodiment, assuming that there is a proportionality relation between an actual curve's radius RR and the steering angle $STR_n$, the amount of correction AC for the first estimated curve's radius $R_{yaw1}$ is calculated using a product of a proportional coefficient of such relation and the variation of the steering angle ΔSTR. However, it is not appropriate to consider that the above proportional coefficient is constant regardless of the length of the actual curve's radius RR. Rather, it is natural to consider that the tighter the curvature of the road on which the vehicle is running becomes, the larger the proportional coefficient becomes.

Consequently, in this embodiment, the amount of correction AC of the first estimated curve's radius $R_{yaw1}$ is calculated by multiplying the product of the proportional coefficient and the variation of the steering angle ΔSTR by the coefficient KS, where the coefficient KS is determined such that the coefficient KS increases as the first estimated curve's radius $R_{yaw1}$ decreases. In this way, the coefficient KS is provided for reflecting the amount of response delay of the yaw rate Yaw to the handling of the driver of the vehicle to steer back the steering wheel around the exit of the curved path and thereby the amount of response delay of the first estimated curve's radius $R_{yaw1}$.

Then, at S711, the amount of correction AC for the first estimated curve's radius $R_{yaw1}$ is calculated in the above-mentioned way. More specifically, the following equation is used to calculate the amount of correction AC.

$$AC=(AVE/STR_n)*\Delta STR*KS$$

Subsequently, at S712, the first estimated curve's radius $R_{yaw1}$ is corrected with the calculated amount of correction AC. More specifically, the second estimated curve's radius $R_{yaw2}$ is calculated by adding the average value AVE (a representative of the first estimated curve's radii $R_{yaw1}$) and the amount of correction AC.

Then, at S713, it is determined whether the first estimated curve's radius $R_{yaw1}$ is equal to or exceeds the second estimated curve's radius $R_{yaw2}$. In the case that the first estimated curve's radius $R_{yaw1}$ is equal to or exceeds the second estimated curve's radius $R_{yaw2}$, the determination is YES, and the first estimated curve's radius $R_{yaw1}$ is selected as the final estimated curve's radius R at S714. In contrast, in the case that the first estimated curve's radius $R_{yaw1}$ is below the second estimated curve's radius $R_{yaw2}$, the determination is NO, and the second estimated curve's radius $R_{yaw2}$ is selected as the final estimated curve's radius R at S715.

In each case, with this, one routine of the curve's radius estimation program is completed.

As is obvious from the above description, in this embodiment, the curve's radius estimation 100 forms an example of the "estimator" according to Aspect 1. Also, a portion of the inter-vehicle distance control ECU 50 for executing S703 forms an example of the "base value estimation part" according to Aspect 2. Also, a portion of the inter-vehicle distance control ECU 50 for executing S707-S712 forms an example of the "estimator" according to Aspect 2.

Also, in this embodiment, a portion of the inter-vehicle distance control ECU 50 for executing S705 and S706 forms an example of the "enabling part" according to Aspect 3. Also, a portion of the inter-vehicle distance control ECU 50 for executing S704 forms an example of the "setting part" according to Aspect 4. Also, a portion of the inter-vehicle distance control ECU 50 for executing S710 and S711 forms an example of the "part" according to Aspect 5. Also, a portion of the inter-vehicle distance control ECU 50 for executing S707-S712 forms an example of the "part" according to Aspect 6.

Also, in this embodiment, a portion of the inter-vehicle distance control ECU 50 for executing S703 forms an example of the "first estimation part" according to Aspect 7. Also, a portion of the inter-vehicle distance control ECU 50 for executing S707-S712 forms an example of the "second estimation part" according to Aspect 7. Also, a portion of the inter-vehicle distance control ECU 50 for executing S713-S715 forms an example of the "final value acquisition part" according to Aspect 7.

Also, in this embodiment, the vehicle speed sensor 60, the yaw rate sensor 62, the steering angle sensor 64, and the curve's radius estimation part 100 cooperatively form an example of the "curve's radius estimation device" according to Aspect 7.

Also, in this embodiment, a portion of the inter-vehicle distance control ECU 50 for executing S713-S715 forms an example of the "selection part" according to Aspect 8.

Also, in this embodiment, a portion of the inter-vehicle distance control ECU 50 for executing S152-S154 forms an example of the "determiner" according to Aspect 18. Further, the vehicle speed sensor 60, the yaw rate sensor 62, the steering angle sensor 64, the radar 40, and the inter-vehicle distance control ECU 50 including the curve's radius estimation part 100 cooperatively form an example of the "preceding vehicle existence determination device" according to Aspect 18.

A second embodiment of the present invention is next described.

In the above first embodiment, the first estimated curve's radius $R_{yaw1}$ is calculated on the basis of the yaw rate Yaw and the vehicle speed $V_n$ but not of the steering angle STR. The second embodiment employs a particular example of a portion that is for calculating the first estimated curve's radius $R_{yaw1}$. This particular example may be implemented together with or separately from a remaining portion other than the portion for calculating the first estimated curve's radius $R_{yaw1}$ in the curve's radius estimation technique.

Figure 9:
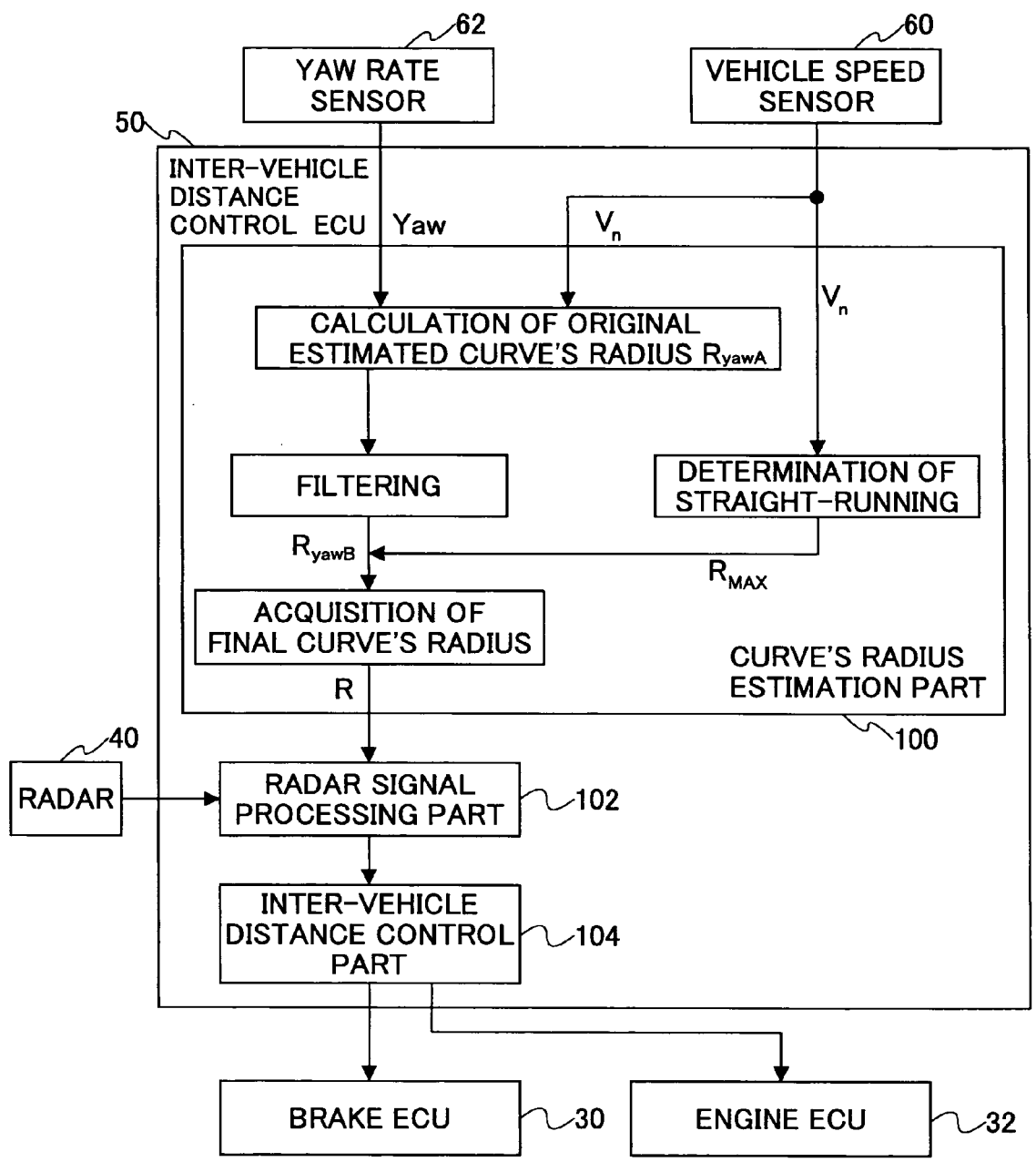
FIG. 9 is a function block diagram conceptually showing a software configuration of an inter-vehicle distance control ECU 50 in an inter-vehicle distance control apparatus including a curve's radius estimation device according to a second embodiment of the present invention.

FIG. 9 conceptually shows the software configuration of the inter-vehicle distance control ECU 50 in the inter-vehicle distance control apparatus according to this embodiment in a function block diagram form. As shown in this figure, the inter-vehicle distance control ECU 50 is configured to include the curve's radius estimation part 100, the radar signal processing part 102, and the inter-vehicle distance control part 104, along with the first embodiment.

And now, with regard to the yaw rate sensor 62, there is a type for detecting the yaw rate of the vehicle body using the yaw moment taking place on the body during the turning of the vehicle. At the same time, magnitude of the yaw moment depends not only on the curve's radius but also on the vehicle speed. Therefore, in the case that the above-mentioned type of yaw rate sensor 62 is employed, it is difficult to accurately detect the yaw rate when the yaw rate taking place on the vehicle body is small due to very slow speed (e.g. equal to or below 10 kilometers per hour) running of the vehicle because proper signals are buried in noise components. Nevertheless, using such detected value to recognize the preceding vehicle, something wrong would occur.

In contrast, the inter-vehicle distance control has a lesser requirement for accurate estimates of the curve's radius during the very slow speed running of the vehicle.

Further, in the above-mentioned type of the yaw rate sensor 62, among the detected yaw rate values, the wobble of value due to the vibration of the vehicle body (suspended members), internal noise within the yaw rate sensor 62, and the like is more likely to take place around the zero point. At the same time, when the detected yaw rate value is pointed to the zero point, correspondingly the vehicle is running straight. Accordingly, if the detected yaw rate value wobbles around the zero point, the estimated curve's radius may have a tendency to show that the vehicle runs on the curved path even when actually running straight.

It is considered as a solution to reduce the errors in the estimation of the curve's radius due to the wobble of the detected yaw rate value by filtering the estimated curve's radius based on the detected yaw rate value with uniform response characteristic over the entire of variable range of the estimated curve's radius.

However, using this solution, when the vehicle runs on the curved path having the curve's radius liable to variation as the vehicle runs, the response of the estimated curve's radius to the actual curve's radius may get worse and might cause, for example, delay in the acquisition of the preceding vehicle by the radar 40.

In this embodiment, as shown in FIG. 9, an original estimated curve's radius $R_{yawA}$ is calculated on the basis of the yaw rate Yaw detected by the yaw rate sensor 62 and the vehicle speed $V_n$ detected by the vehicle speed sensor 60.

The calculated original estimated curve's radius $R_{yawA}$ is filtered (with a Butterworth type of low-pass filter). As described below in more detail, this filtering is varied depending on the original estimated curve's radius $R_{yawA}$, of which cut-off frequency is an example of an expected value of the curve's radius. The filtered original estimated curve's radius $R_{yawA}$ is now recognized as a temporarily estimated curve's radius $R_{yawB}$, and then is made the final curve's radius R.

In addition, in this embodiment, as shown in FIG. 9, it is determined whether the vehicle runs straight on the basis of the vehicle speed $V_n$ detected by the vehicle speed sensor 60. If it is determined that the vehicle runs straight, the final curve's radius R is recognized to have the maximum $R_{MAX}$.

In each case, the final curve's radius R is supplied to the radar signal processing part 102, which processes the output signals from the radar 40.

FIG. 10 conceptually shows the content of the curve's radius estimation program according to this embodiment in a flowchart form. However, portions of the deceleration control program, which are not essential to understanding the present invention, are omitted in FIG. 10.

In other words, in this embodiment, the curve's radius estimation part 100 is configured by a portion of the inter-vehicle distance control ECU 50, which portion is for executing the curve's radius estimation program in FIG. 10.

In the curve's radius estimation program, at S801, the vehicle speed $V_n$ is detected by the vehicle speed sensor 60. Then, at S802, the yaw rate Yaw is detected by the yaw rate sensor 62.

Subsequently, at S803, it is determined whether the detected vehicle speed $V_n$ is equal to or exceeds a predetermined value $V_{n0}$ so as to determine whether the vehicle is conducting very slow speed running. In the case that the vehicle is conducting very slow speed running, the determination is NO. Subsequently, it is determined at S804 that the vehicle runs straight, and then it is determined at S805 that the final curve's radius R is made a predetermined maximum $R_{MAX}$.

With this, one routine of the curve's radius estimation program is completed.

In contrast, in the case that the vehicle is not conducting very slow speed running, the determination at S803 is YES. Then, the original estimated curve's radius $R_{yawA}$ is calculated using the detected vehicle speed $V_n$ and yaw rate Yaw. The original estimated curve's radius $R_{yawA}$ may be calculated, for example, by dividing the vehicle speed $V_n$ by the yaw rate Yaw.

Subsequently, at S807, it is determined whether the calculated estimated curve's radius $R_{yawA}$ is equal to or exceeds a predetermined value $R_{yaw0}$ so as to determine whether the road on which the vehicle is running is a straight path or the like.

In the case that the original estimated curve's radius $R_{yawA}$ is equal to or exceeds the predetermined value $R_{yaw0}$, the determination is YES, and a plurality of previously acquired values including the latest value of the original estimated curve's radius $R_{yawA}$ is filtered with the low-pass filter LPF of which cut-off frequency is a low frequency $f_{LO}$ at S808.

In this filtering, for example, the plurality of previously acquired values may be averaged with weighting, and each value of weighting factors multiplied by previous values may be adjusted so as to achieve a desired cut-off frequency.

Subsequently, at S809, the temporarily estimated curve's radius $R_{yawB}$ is acquired as a result of such filtering. Then, at S810, the acquired estimated curve's radius $R_{yawB}$ is made the final curve's radius R.

With this, one routine of the curve's radius estimation program is completed.

In the above, the case that the original estimated curve's radius $R_{yawA}$ is equal to or exceeds the predetermined $R_{yaw0}$ is described. Otherwise, the determination at S807 is NO, and the plurality of previously acquired values including the latest value of the original estimated curve's radius $R_{yawA}$ is filtered with the low-pass filter LPF of which cut-off frequency is a high frequency $f_{HI}$ ($>f_{LO}$) at S811.

This filtering has a characteristic to pass original signals smoothly in a wider frequency range than in the filtering at S808. Therefore, according to this filtering, the temporarily estimated curve's radius $R_{yawB}$ is acquired such that it can respond to the variation of the actual curve's radius more sensitively.

Subsequently, proceeding to S810 via S809, one routine of the curve's radius estimation program is completed.

As is obvious from the above description, in this embodiment, the curve's radius estimation part 100 in FIG. 9 forms an example of the "part" according to Aspect 14 as well as an example of the "estimator" according to Aspect 15. Also, a portion of the inter-vehicle distance control ECU 50 for executing S803-S805 forms an example of the "setting part" according to Aspect 16.

Also, in this embodiment, the vehicle speed sensor 60, the yaw rate sensor 62, and the curve's radius estimation part 100 in FIG. 9 cooperatively form an example of the "curve's radius estimation device" according to Aspect 15.

Also, in this embodiment, the yaw rate sensor 62 forms an example of the "turning state quantity sensor" according to Aspect 17. Also, the curve's radius estimation part 100 forms an example of the "estimator" according to Aspect 17. Further, the vehicle speed sensor 60, the yaw rate sensor 62, and the curve's radius estimation part 100 cooperatively form an example of the "curve's radius estimation device" according to Aspect 17.

Although the embodiments of the present invention are described in detail with reference to the drawings, since these are only for exemplification, the present invention can be implemented in other embodiments such as the above-mentioned Aspects in which various variations and modifications are made based on knowledge of a skilled person in the art.

What is claimed is:

1. A curve's radius estimation device for estimating a curve's radius of a road on which a vehicle shall run, comprising:
    a vehicle speed sensor that detects an actual speed of the vehicle;
    a yaw rate sensor that detects an actual yaw rate of the vehicle;
    a steering angle sensor that detects an angle of a steering wheel handled by a driver of the vehicle as an actual steering angle; and
    an estimator that estimates the curve's radius on the basis of the actual vehicle speed detected by the vehicle speed sensor, the actual yaw rate detected by the yaw rate sensor, and the actual steering angle detected by the steering angle sensor, wherein the estimator comprises:
        a base value estimation part that estimates the curve's radius as a base value on the basis of the actual vehicle speed and the actual yaw rate but not of the steering angle; and
        an estimation part that determines an amount of correction for the base value on the basis of physical quantity regarding the steering angle, and estimates the curve's radius by correcting the base value with the amount of correction.

2. The curve's radius estimation device as claimed in claim 1, the estimator further comprising an enabling part enables the estimation of the curve's radius when an expected value of the curve's radius is equal to or below a predetermined value and a state of temporal variation of the curve's radius does not exceed a predetermined state for a predetermined time period or longer.

3. The curve's radius estimation device as claimed in claim 2, the estimator further comprising a setting part that sets the predetermined time period such that the predetermined time period is shortened as the actual vehicle speed increases.

4. The curve's radius estimation device as claimed in claim 1, the estimation part estimates the curve's radius such that the estimate of the curve's radius responds to a variation of the actual steering angle more sensitively when an expected value of the curve's radius is relatively small than when the expected value is relatively large.

5. The curve's radius estimation device as claimed in claim 1, the estimator further comprising a part that determines the amount of correction for the base value using a product of an amount of variation of the base value per a certain range of the actual steering angle, an amount of variation of the actual steering angle per a certain time period, and a coefficient that increases as an expected value of the curve's radius decreases, and estimating the curve's radius by correcting the base value with the determined amount of correction.

6. The curve's radius estimation device as claimed in claim 1, the estimator comprising a determination part that determines that the vehicle is under a straight running state when the actual vehicle speed is equal to or below a predetermined speed regardless of detected values of the actual yaw rate.

7. A preceding vehicle existence determination apparatus comprising:
    the curve's radius estimation device claimed in claim 1;
    a sensor provided in the vehicle detects an object located in front of the vehicle; and
    a determiner that determines a present lane probability in which a preceding vehicle is running on the same lane with the present vehicle when the object detected by the sensor is a moving object that is the preceding vehicle, and determines that a preceding vehicle exists for which the present vehicle is tracking when the determined present lane probability is equal to or exceeds a predetermined probability, the determiner determines the present lane probability on the basis of output signals of the sensor and the curve's radius estimated by the curve's radius estimation device in accordance with a predetermined relationship between at least one of a first distance and a second distance and the present lane probability, and, the first distance representing how far the preceding vehicle is out of the lane in a lane-width direction, and the second distance representing how far the preceding vehicle is away from the present vehicle along with the lane in a vehicle traveling direction.

* * * * *